(12) United States Patent
Takanashi

(10) Patent No.: US 9,719,769 B2
(45) Date of Patent: Aug. 1, 2017

(54) BIDIRECTIONAL DISPLACEMENT DETECTOR

(71) Applicant: TOKYO SEIMITSU CO., LTD., Tokyo (JP)

(72) Inventor: Ryo Takanashi, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 15/207,356

(22) Filed: Jul. 11, 2016

(65) Prior Publication Data

US 2017/0003110 A1 Jan. 5, 2017

Related U.S. Application Data

(63) Continuation of application No. PCT/JP2015/056331, filed on Mar. 4, 2015.

(30) Foreign Application Priority Data

Mar. 14, 2014 (JP) .................................. 2014-052678

(51) Int. Cl.
*G01B 7/00* (2006.01)
*G01B 7/34* (2006.01)
(Continued)

(52) U.S. Cl.
CPC .............. *G01B 7/001* (2013.01); *G01B 5/012* (2013.01); *G01B 7/012* (2013.01); *G01B 7/28* (2013.01); *G01B 7/282* (2013.01); *G01B 7/34* (2013.01)

(58) Field of Classification Search
CPC .......... G01B 7/001; G01B 7/012; G01B 7/28; G01B 7/282; G01B 7/34; G01B 5/012
(Continued)

(56) References Cited

U.S. PATENT DOCUMENTS 3,945,124 A    3/1976   Jacoby et al.
4,503,616 A * 3/1985   Pullen .................... G01B 7/001
                                                        33/558

(Continued)

FOREIGN PATENT DOCUMENTS

EP    0068899    1/1983
GB    2098331    11/1982
(Continued)

OTHER PUBLICATIONS

International Search Report for PCT App No. PCT/JP2015/056311 dated Apr. 14, 2015, 4 pgs.

(Continued)

*Primary Examiner* — Christopher Fulton
(74) *Attorney, Agent, or Firm* — Procopio, Cory, Hargreaves & Savitch LLP

(57) ABSTRACT

A bidirectional displacement detector according to the present invention includes: a displacement detector which includes a first detection element and a second detection element; a base at which the first detection element is provided; an arm which is coupled to the base so as to be rotatable around an arm rotation axis extending in a horizontal direction, and at which the second detection element is provided; and a probe which is coupled to the base so as to be rotatable around a probe rotation axis perpendicular to the arm rotation axis. The probe has a contact part provided at a position away from the probe rotation axis, and a pair of abutment parts which is disposed along a direction of the arm rotation axis and on both sides with the probe rotation axis interposed therebetween and comes into contact with the arm so as to be able to be separated from the arm. Each of the pair of abutment parts is in contact with the arm from the lower side thereof and is biased upward.

6 Claims, 15 Drawing Sheets

(51) Int. Cl.
*G01B 7/28* (2006.01)
*G01B 5/012* (2006.01)
*G01B 7/012* (2006.01)

(58) Field of Classification Search
USPC .......................................... 33/566, 503, 559
See application file for complete search history.

(56) References Cited

U.S. PATENT DOCUMENTS

| | | | | |
|---|---|---|---|---|
| 4,897,929 | A | | 2/1990 | Ernst et al. |
| 4,937,948 | A | * | 7/1990 | Herzog ................. G01B 5/012 33/556 |
| 5,224,274 | A | | 7/1993 | Blaiklock |
| 5,339,535 | A | * | 8/1994 | McMurtry ............... B23Q 5/58 33/558 |
| 5,979,070 | A | * | 11/1999 | Lau ........................ G01B 5/012 33/503 |
| 6,467,184 | B1 | * | 10/2002 | Wust ...................... G01B 5/012 33/783 |
| 6,874,243 | B2 | * | 4/2005 | Hama ..................... G01B 5/28 33/551 |
| 7,197,835 | B2 | * | 4/2007 | Takanashi ............ G01B 5/0002 33/503 |
| 8,312,635 | B2 | * | 11/2012 | Jordil ..................... G01B 5/012 33/503 |
| 8,627,576 | B2 | * | 1/2014 | Engel .................... G01B 21/045 33/503 |
| 2009/0031575 | A1 | * | 2/2009 | Tomelleri ............... G01B 7/012 33/561 |
| 2014/0109419 | A1 | * | 4/2014 | Shindo ................... G01B 5/008 33/502 |
| 2015/0292851 | A1 | * | 10/2015 | Yamamoto ............... G01B 5/20 33/503 |

FOREIGN PATENT DOCUMENTS

| | | | | |
|---|---|---|---|---|
| JP | 50-81171 | | 1/1975 | |
| JP | 62-147303 | | 7/1987 | |
| JP | 63-142209 | | 6/1988 | |
| JP | 01-156616 | | 6/1989 | |
| JP | GB 2341244 A | * | 3/2000 | ............ G01B 3/008 |
| JP | 3127831 | | 11/2006 | |
| JP | 4884376 | | 2/2012 | |

OTHER PUBLICATIONS

Notice of Reasons for Rejection for JP App No. 2015-093577 dated May 19, 2015, 7 pgs.
International Preliminary Report on Patentability for PCT App No. PCT/JP2015/056331 dated Nov. 13, 2015, 6 pgs.
European Search Report for EP App No. 15762056.8 dated Jan. 12, 2017, 4 pgs.

* cited by examiner

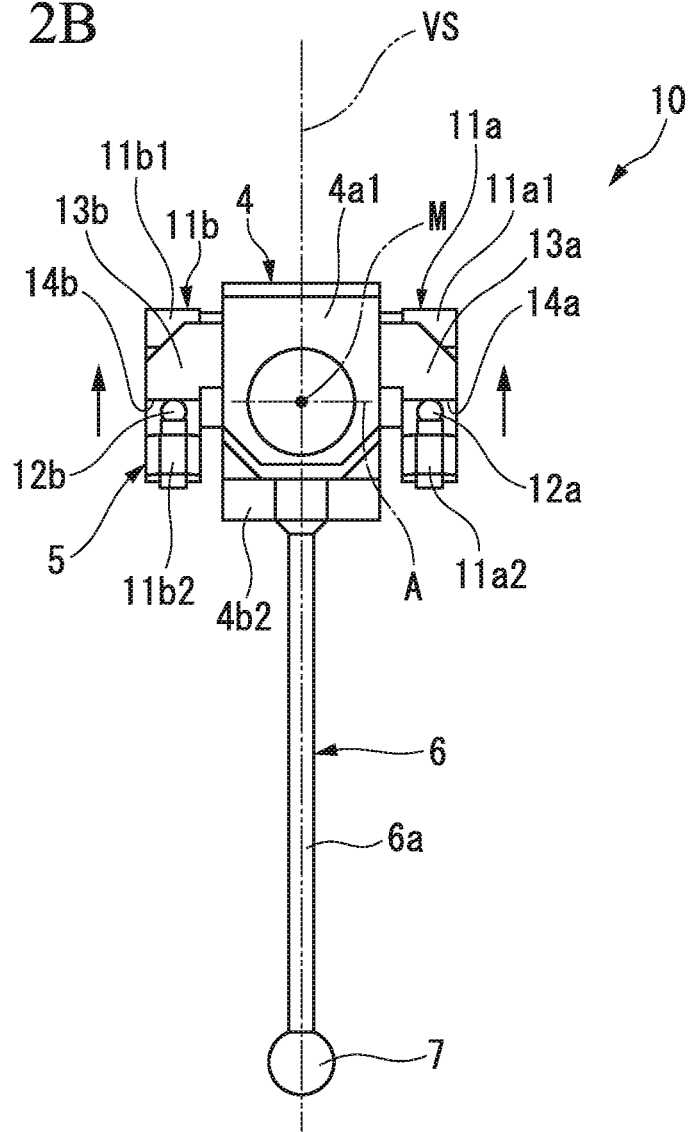

BIDIRECTIONAL DISPLACEMENT DETECTOR

This application is a Continuation of PCT Application No: PCT/JP2015/056311 under 35 USC 365(c), filed Mar. 4, 2015, which claims priority of Japanese Patent Application No. 2014-052678, filed Mar. 14, 2014, the content of which is incorporated herein by reference.

TECHNICAL FIELD

The present invention relates to a bidirectional displacement detector.

BACKGROUND ART

In the related art, in a displacement detector which is used for roundness measurement, surface roughness measurement, shape measurement, or the like, a direction in which detection is possible is a single direction. For this reason, for example, in the case of performing bidirectional measurement of facing surfaces or opposite surfaces (back-to-back surfaces) such as a front surface and a rear surface, an upper surface and a lower surface, or an outer diameter (an outer peripheral surface) and an inner diameter (an inner circumferential surface) of a workpiece (an object to be measured), it is necessary to invert a measurement direction by rotating a displacement detector by 180, or mechanically or electrically change a direction of a measuring force (a force pressing a probe of the displacement detector against a measured surface of the workpiece by biasing of a spring or the like, that is, contact pressure).

For example, in a displacement detector disclosed in PTL 1, in order to perform bidirectional displacement detection without reversely moving the displacement detector, two sets of displacement detector composed of a bobbin (a fixed detection element) and a core (a movable detection element) in a pair are used (refer to FIGS. 3A to 3C of PTL 1).

Then, a contact part 22A or 22B of the tip of an arm 21 is pressed against a surface (a measured surface) A or B of a workpiece W, whereby the measuring force is generated by the biasing of a spring 24, and when one set of the two sets of displacement detector is in a detectable range, displacement is detected.

Further, in FIGS. 10, 11A, and 11B of PTL 1, in order to perform bidirectional displacement detection by a set of displacement detector (a bobbin 26 and a core 25), a plurality of arms 41, 21A, and 21B, a plurality of springs 24A and 24B, and a plurality of stoppers 30A and 30B are used.

Then, a contact part 42A or 42B of the tip of an arm 41 is pressed against the surface A or B of the workpiece W, whereby the measuring force is generated in the arm 21A or 21B away from the stopper 30A or 30B by the biasing of the spring 24A or 24B, and when the displacement detector is in a detectable range, displacement is detected.

CITATION LIST

Patent Literature

[PTL 1] Japanese Patent No. 4884376

SUMMARY OF INVENTION

Technical Problem

However, the displacement detector of the related art has the following problems.

That is, in an example of the related art shown in FIGS. 3A to 3C of PTL 1, a measuring force in a state (a free position) where the contact part is not pressed against the measured surface of the workpiece is set to be 0, and the displacement detector is used by pressing the measured surface against the contact part until the measuring force acts on the contact part. For this reason, the measuring force in the vicinity of the free position becomes close to 0 and a detection value becomes unstable, and thus an unusable range becomes larger. Further, two sets of displacement detector are used, and therefore, a structure is complicated and a manufacturing cost is expensive.

The relationship between a measurement position (the movement amount in a detection direction of the contact part) and a measuring force in the example of the related art is shown in a graph of FIG. 6B appended to this specification.

In addition, the portion shown by hatching in the drawing shows a usable range (an allowable range of the measurement position) of the displacement detector. In the illustrated example, the measurement positions corresponding to the range of the measuring force from −6 to −4 and the range of the measuring force from +4 to +6 are set as the usable ranges.

As shown in FIG. 6B, in the displacement detector of the related art, a large usable range cannot be secured.

Further, in an example of the related art shown in FIGS. 10, 11A, and 11B of PTL 1, a structure is made in which a contact arm 41 is transferred between a first arm 21A and a second arm 21B. For this reason, even in this displacement detector, the measuring force (the detection value) becomes still unstable in a transfer area, and thus the displacement detector has an unusable range.

Here, the relationship between the measurement position and the measuring force in this example of the related art is shown in a graph of FIG. 6C appended to this specification.

In this example, the usable range of the displacement detector is wide, as compared to the example of the related art shown in FIG. 6B described above. However, in the vicinity of the range from −1 to +1 (the vicinity of the transfer area) of the measurement position, the measuring force cannot be still secured, and thus the displacement detector becomes unusable. Further, also in this example, there is a problem in that a structure is complicated and a manufacturing cost is expensive.

The present invention has been made in view of such circumstances and has an object to provide a bidirectional displacement detector in which it is possible to reduce a manufacturing cost by simplifying a structure and it is possible to improve displacement detection performance by securing a large usable range of a measurement position.

Solution to Problem (1) According to an aspect of the present invention, there is provided a bidirectional displacement detector including: a displacement detector which includes a first detection element and a second detection element movable relative to each other; a base at which the first detection element is provided; an arm which is coupled to the base so as to be rotatable around an arm rotation axis extending in a horizontal direction, and at which the second detection element is provided; and a probe which is coupled to the base so as to be rotatable around a probe rotation axis extending along a virtual plane perpendicular to the arm rotation axis, wherein the probe has a contact part provided at a position away from the probe rotation axis, and a pair of abutment parts which is disposed along a direction of the arm rotation axis and on both sides with the probe rotation axis interposed therebetween and comes into contact with the arm so as to be able to be separated from the arm, and each of the pair of abutment parts is in contact with the arm from the lower side thereof and is biased upward.

(2) According to other aspect of the present invention, there is provided a bidirectional displacement detector including: a displacement detector which includes a first detection element and a second detection element movable relative to each other; a base at which the first detection element is provided; an arm which is coupled to the base so as to be rotatable around an arm rotation axis extending in a horizontal direction, and at which the second detection element is provided; and a probe which is coupled to the base so as to be rotatable around a probe rotation axis extending along a virtual plane perpendicular to the arm rotation axis, wherein the probe has a contact part provided at a position away from the probe rotation axis, and a pair of abutment parts which is disposed along a direction of the arm rotation axis and on both sides with the probe rotation axis interposed therebetween and comes into contact with the arm so as to be able to be separated from the arm, and each of the pair of abutment parts is in contact with the arm from the upper side thereof and is biased downward.

In the bidirectional displacement detector according to the present invention, the arm and the probe are coupled to the base so as to be rotatable around the respective rotation axes (the arm rotation axis and the probe rotation axis). Further, the probe rotation axis extends in the virtual plane perpendicular to the arm rotation axis (that is, orthogonal or twisted positions are included in the positional relationship between these rotation axes).

At the time of measurement such as roundness measurement, surface roughness measurement, or shape measurement by the bidirectional displacement detector, a measured surface of a workpiece (an object to be measured) is pressed against the contact part of the probe. Then, the probe rotates to one side or the other side (one of two directions) in the circumferential direction around the probe rotation axis with respect to the base against a biasing force of the arm biasing the pair of abutment parts.

By the rotation of the probe, the arm is separated from the other abutment part while being pressed against one abutment part out of the pair of abutment parts, whereby the arm rotates toward the other side (the side opposite to one side along the circumferential direction in which the arm is biased) in the circumferential direction around the arm rotation axis with respect to the base.

By the rotation of the arm, the relative position between the first detection element provided at the base and the second detection element provided at the arm is displaced, and therefore, it is possible to measure displacement of the measured surface.

A graph of FIG. 6A shows the relationship between a measurement position (a displacement amount toward a detection direction (plus or minus) from a reference position (a measurement position 0) of the contact part) and a measuring force in the bidirectional displacement detector according to the present invention.

Further, the portion shown by hatching in the drawing shows a usable range (an allowable range of the measurement position) of the bidirectional displacement detector. In the illustrated example, the measurement positions corresponding to the range of the measuring force from −6 to −4 and the range of the measuring force from +4 to +6 are set as the usable ranges.

As shown in this graph, according to the present invention, the contact part is pressed against the measured surface, whereby the probe begins to rotate around the probe rotation axis, and from the moment one abutment part out of the pair of abutment parts of the probe is separated from the arm, detection of displacement is possible.

That is, according to the present invention, even in a state where the contact part is not in contact with the measured surface of the workpiece, it is possible to create a stand-by state of being able to immediately apply a sufficient measuring force (a force pressing the contact part against the measured surface of the workpiece by biasing, that is, contact pressure) from two directions along the detection direction (both sides in the circumferential direction around the probe rotation axis) to the contact part.

Specifically, at the moment one abutment part out of the pair of abutment parts is separated from the arm by pushing of the contact part (pressing against the contact part) by the measured surface, the measuring force immediately reaches from 0 to a predetermined value (a predetermined range). Therefore, a transfer area or the like, in which the measuring force remains in the vicinity of 0, as in the related art, whereby a detection value becomes unstable, does not exist.

For this reason, as shown in FIG. 6A, if it is a measurement position with the exception of 0, even toward one side (the plus side) in which the measurement position exceeds 0, out of two directions (both sides in the horizontal axis with the measurement position 0 interposed therebetween) in which displacement is detected, or even toward the other side (the minus side) in which the measurement position is less than 0, a sufficient measuring force can be secured even in the vicinity of the measurement position 0.

Further, the pair of abutment parts of the probe respectively comes into contact with the arm from both sides in the circumferential direction around the probe rotation axis and is biased with an equal force toward the opposite sides in the circumferential direction, thereby being balanced. Therefore, it is possible to accurately set a detection limit position in advance with the equilibrium state as a reference position and based on the relative position between the first and second detection elements of the displacement detector at the reference position.

Therefore, it is possible to stabilize the reference position of the contact part at a time other than the time of measurement. Further, position accuracy of the contact part at the reference position is secured with a high degree of accuracy, and therefore, even if the displacement detector which is composed of the first detection element and the second detection element in a pair is only one set, it is possible to secure a large measurement range of displacement detection and it is possible to stably enhance detection accuracy.

Furthermore, it is not necessary to use a complicated structure in which a plurality of displacement detector, a plurality of arms, a plurality of springs, a plurality of stoppers, and the like are provided, as in the related art, and thus a structure can be simplified.

From the above, according to the present invention, it is possible to reduce a manufacturing cost by simplifying a structure, and it is possible to improve displacement detection performance by securing a large usable range of the measurement position.

(3) The arm rotation axis and the probe rotation axis may be orthogonal to each other.

(4) The arm rotation axis and the probe rotation axis may be disposed at mutually twisted positions.

Advantageous Effects of Invention

According to the bidirectional displacement detector according to the present invention, it is possible to reduce a manufacturing cost by simplifying a structure and it is possible to improve displacement detection performance by securing a large usable range of a measurement position.

BRIEF DESCRIPTION OF DRAWINGS

FIG. 2B is a front view of the bidirectional displacement detector shown in FIG. 1.

DESCRIPTION OF EMBODIMENTS

First Embodiment

Figure 1:
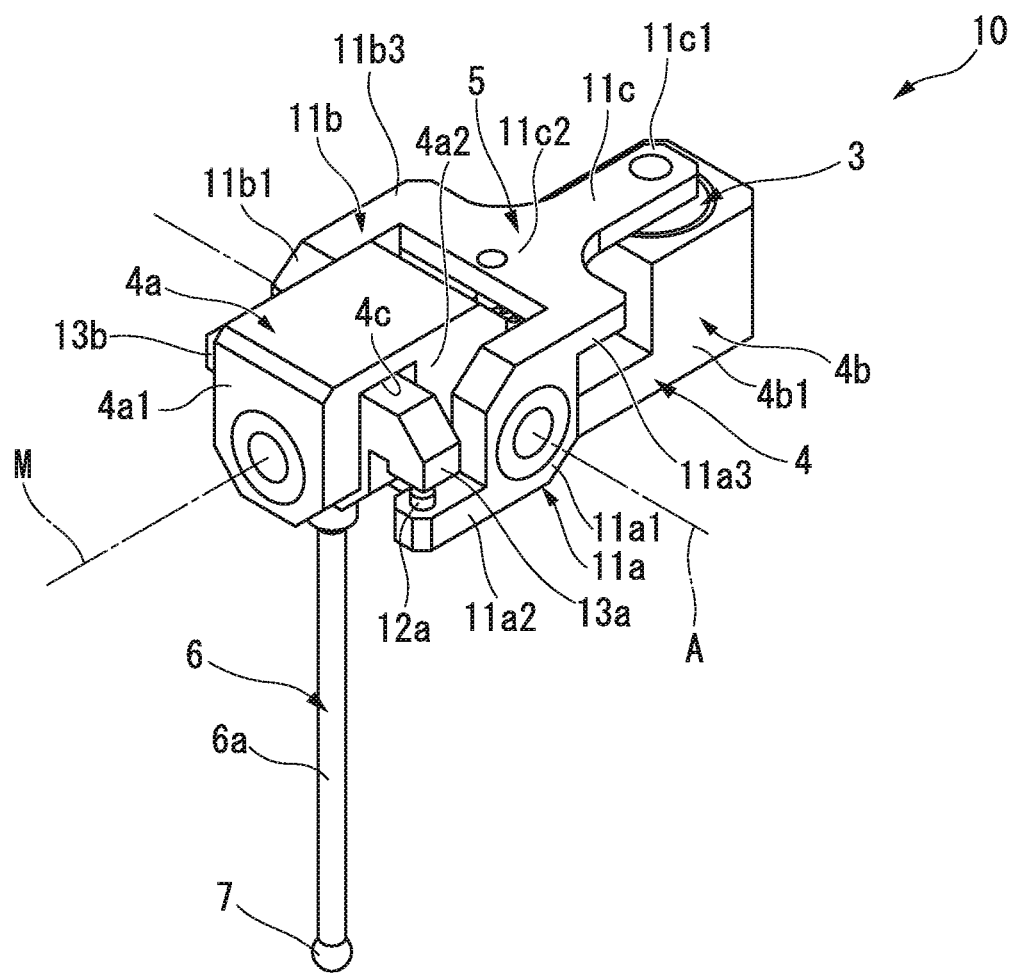
FIG. 1 is a perspective view showing a bidirectional displacement detector according to a first embodiment of the present invention.

Hereinafter, a bidirectional displacement detector 10 according to a first embodiment of the present invention will be described with reference to the drawings.

First, a schematic configuration of the bidirectional displacement detector 10 of this embodiment will be described.

The bidirectional displacement detector 10 is used for roundness measurement, surface roughness measurement, shape measurement, or the like. Specifically, the bidirectional displacement detector 10 is a displacement detector in which it is possible to perform bidirectional measurement of measured surfaces which are facing surfaces or opposite surfaces (back-to-back surfaces), such as a front surface and a rear surface, an upper surface and a lower surface, or an outer diameter (an outer circumferential surface) and an inner diameter (an inner circumferential surface) of a workpiece (an object to be measured).

As shown in FIGS. 1 to 5C, the bidirectional displacement detector 10 of this embodiment is provided with: a displacement detector 3 which includes a first detection element 1 and a second detection element 2 movable relative to each other; a base 4 at which the first detection element 1 is provided; an arm 5 which is coupled to the base 4 so as to be rotatable around an arm rotation axis (a first rotation axis) A, and at which the second detection element 2 is provided; a probe 6 which is coupled to the base 4 so as to be rotatable around a probe rotation axis (a second rotation axis) M extending along a virtual plane VS perpendicular to the arm rotation axis A, and in which a contact part 7 is provided at a position away from the probe rotation axis M; and a biasing part 8 which biases the arm 5 toward one side a1 in a circumferential direction around the arm rotation axis A with respect to the base 4.

In an example of this embodiment, both the arm rotation axis A and the probe rotation axis M extend along a horizontal plane. Specifically, the rotation axes A and M respectively extend in horizontal directions different from each other and are orthogonal to each other.

Further, the probe 6 formed in a shaft shape extends toward the lower side in the vertical direction in a direction orthogonal to the probe rotation axis M from the probe rotation axis M and has the contact part 7 disposed at a tip portion (a lower end portion) thereof.

Further, the base 4 supports the probe 6 at one side out of portions which are located along a direction of the probe rotation axis M and on both sides with the arm rotation axis A interposed therebetween, and the first detection element 1 (the displacement detector 3) is disposed on the other side.

In this embodiment, in a direction in which the probe 6 extends, a direction toward the contact part 7 (a downward direction in FIGS. 2A and 2B) is referred to as a downward direction and a direction toward the side opposite to the contact part 7 (an upward direction in FIGS. 2A and 2B) is referred to as an upward direction.

Further, in the base 4, a direction toward the probe 6 side (a rightward direction in FIG. 2A) from the arm rotation axis A along the probe rotation axis M is referred to as a forward direction and a direction toward the first detection element 1 side (a leftward direction in FIG. 2A) from the arm rotation axis A is referred to as a backward direction.

At the time of measurement of a workpiece using the bidirectional displacement detector 10, a measured surface of the workpiece is pressed against the contact part 7 of the probe 6 from one of both sides along a direction of the arm rotation axis A (a right-left direction in FIG. 2B).

Further, at the time of the measurement, the probe 6 is biased toward the measured surface such that a state where the contact part 7 of the probe 6 is in contact with the measured surface of the workpiece (a close contact state) is stably maintained. In this embodiment, the biasing force is referred to as a "measuring force".

Specifically, the contact part 7 of the probe 6 is pushed along a detection direction (a circumferential direction around the probe rotation axis M) according to the concavo-convex shape or the like of the measured surface, or is displaced so as to restore toward the opposite side to a pushing direction by biasing, whereby a state where the contact part 7 is in close contact with the measured surface is maintained.

Further, the probe 6 rotationally moves (oscillates) in the circumferential direction around the probe rotation axis M according to the above-described oscillation of the contact part 7. Then, the arm 5 rotationally moves (oscillates) in a circumferential direction around the arm rotation axis A according to the rotational movement of the probe 6. In this way, the second detection element (a movable detection element) 2 provided at the arm 5 moves with respect to the first detection element (a fixed detection element) 1 provided at the base 4, whereby it is possible to detect a surface position (displacement) of the workpiece.

Next, each constituent element of the bidirectional displacement detector 10 will be described in detail.

Figure 3:
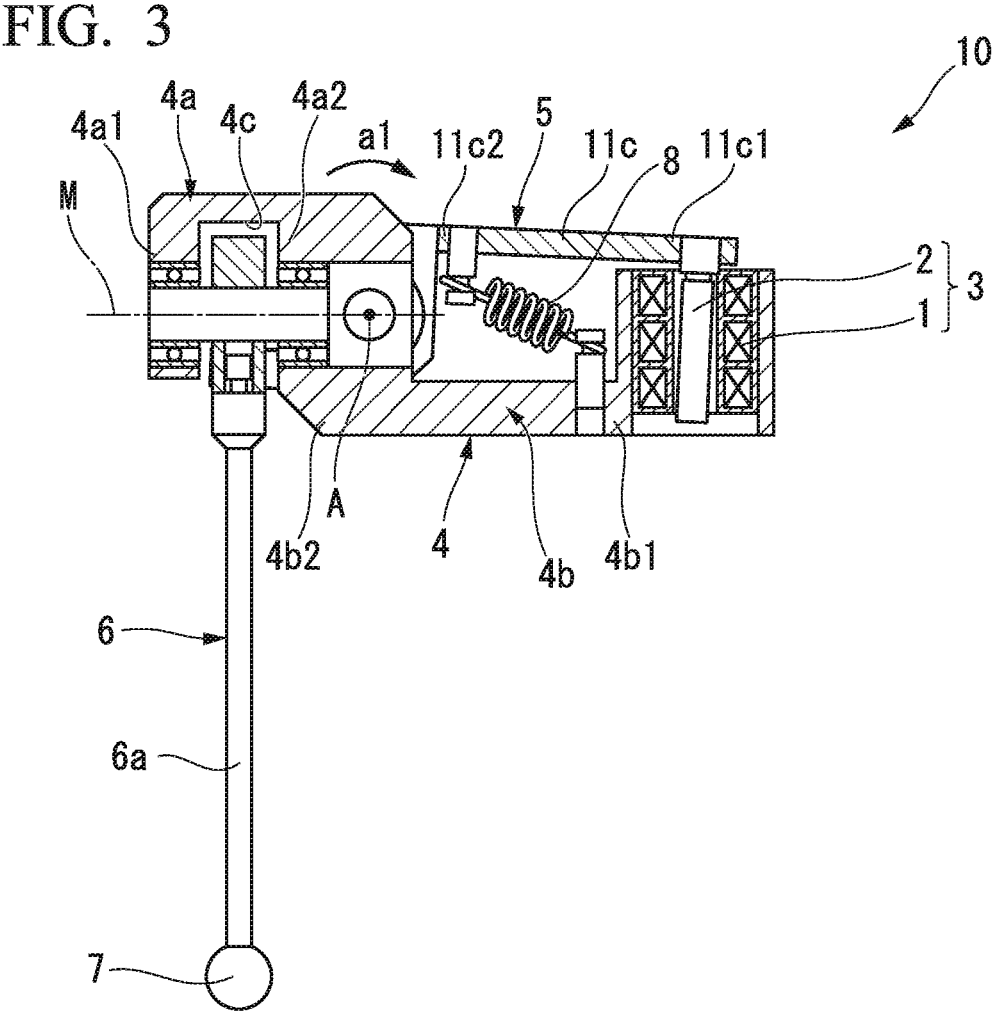
FIG. 3 is a right side view of the bidirectional displacement detector shown in FIG. 1.

In this embodiment, as the displacement detector 3, a differential transformer type is adopted. As shown in FIG. 3, the second detection element 2 provided at the arm 5 has a core made of a cylindrical iron core.

The first detection element 1 provided at the base 4 has a plurality of transformers (bobbins) into which the core is inserted. The plurality of transformers are adjacently disposed along a direction in which the core moves with respect to the first detection element 1.

Further, the relative position (displacement) between the first and second detection elements 1 and 2 is detected by utilizing an alternating-current signal which is induced in the other remaining transformers when an alternating-current signal is input to one transformer in the first detection element 1 changing according to the position of the core of the second detection element 2.

Further, it is acceptable if the displacement detector 3 can detect the relative position between the first and second detection elements 1 and 2, and therefore, the displacement detector 3 is not limited to the differential transformer type. That is, as the displacement detector 3, for example, a grating interference type or the like, which detects movement associated with the rotation of an optical grating by an interferometer, may be adopted.

Figure 2A:
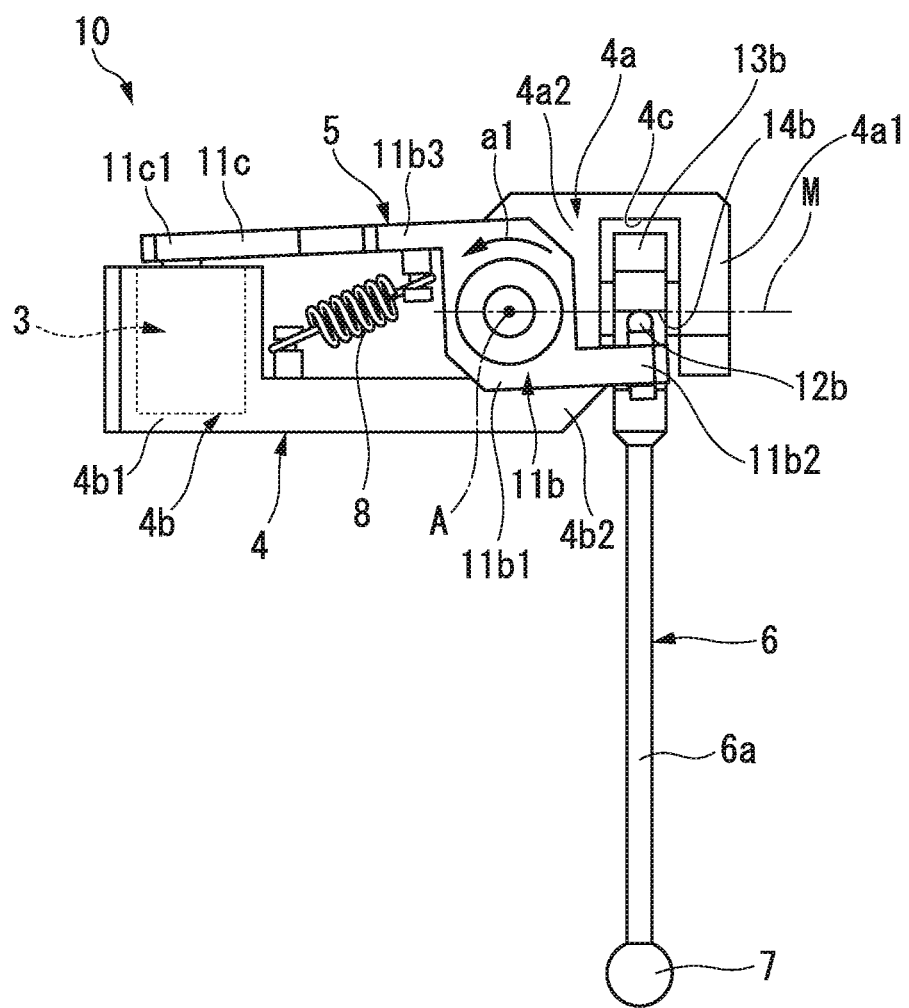
FIG. 2A is a left side view of the bidirectional displacement detector shown in FIG. 1.

As shown in FIGS. 2A and 3, the base 4 extends along the direction of the probe rotation axis M (a front-back direction). The base 4 has a front portion 4a which is located in front of the arm rotation axis A, and a rear portion 4b which is located in the rear of the arm rotation axis A.

As shown in FIG. 3, when viewed in a cross section perpendicular to the arm rotation axis A (when viewed in a vertical cross section), the front portion 4a of the base 4 is formed in a U-shape having a recess 4c which is open downward, or a sideways U-shape. An upper end portion (a portion in which the probe rotation axis M is disposed) of the probe 6 is accommodated in the recess 4c.

Further, the probe 6 is supported so as to be rotatable around the probe rotation axis M, by a front wall 4a1 which is located in front of the recess 4c in the front portion 4a, and a rear wall 4a2 which is located in the rear of the recess 4c.

Further, as shown in FIG. 2A, the arm 5 is supported on the rear wall 4a2 of the front portion 4a so as to be rotatable around the arm rotation axis A.

Further, when viewed in the vertical cross section shown in FIG. 3, the rear portion 4b of the base 4 is located below the arm rotation axis A and extends along the front-back direction. The first detection element 1 is provided to be erect at a rear end portion 4b1 of the rear portion 4b. Further, the rear wall 4a2 of the front portion 4a is provided to be erect at a front end portion 4b2 of the rear portion 4b, and the front portion 4a and the rear portion 4b are formed integrally.

As shown in FIGS. 1 and 2A, the arm 5 has a pair of arm portions 11a and 11b which forms a front portion of the arm 5, and a connection portion 11c which forms a rear portion of the arm 5 and connects the pair of arm portions 11a and 11b to each other.

The pair of arm portions 11a and 11b is disposed to be spaced apart from each other along the direction of the arm rotation axis A and on both sides of the base 4 and is supported on the base 4 so as to be rotatable around the arm rotation axis A.

The second detection element 2 is disposed at the connection portion 11c.

As shown in FIG. 2A, in a side view as viewed from the direction of the arm rotation axis A, each of the pair of arm portions 11a and 11b is formed in a S-shape or a Z-shape. Further, in the side view, each of central portions 11a1 and 11b1 along the front-back direction of the arm portions 11a and 11b is formed in a rectangular shape long in an up-and-down direction. The arm rotation axis A is disposed at the central portions 11a1 and 11b1.

Further, in the arm portions 11a and 11b, front end portions 11a2 and 11b2 which are located further toward the front side than the central portions 11a1 and 11b1 are located below the arm rotation axis A and extend forward from lower end portions of the central portions 11a1 and 11b1.

The front end portions 11a2 and 11b2 of the arm portions 11a and 11b are disposed such that the front end portions 11a2 and 11b2 and the probe 6 are in corresponding positional relationships in the direction of the probe rotation axis M. Projection portions 12a and 12b are respectively provided to protrude upward at the front end portions 11a2 and 11b2. Each of tip portions (upper end portions) of the projection portions 12a and 12b is formed in a hemispherical shape and disposed to face each of a pair of abutment parts 13a and 13b (described later) of the probe 6.

Further, in the arm portions 11a and 11b, rear end portions 11a3 and 11b3 which are located further toward the rear side than the central portions 11a1 and 11b1 are located above the arm rotation axis A and extend rearward from upper end portions of the central portions 11a1 and 11b1.

As shown in FIG. 1, the connection portion 11c is formed in a T-shape when viewed in a top view. The connection portion 11c connects the rear end portions 11a3 and 11b3 of the pair of arm portions 11a and 11b to each other in the direction of the arm rotation axis A at a position further on the rear side than the front portion 4a of the base 4.

As shown in FIG. 3, the second detection element 2 is suspended from a rear end portion 11c1 of the connection portion 11c. The second detection element 2 is inserted into the first detection element 1 of the base 4 and is made so as to be movable with respect to the first detection element 1 in a circumferential direction around the arm rotation axis A (a substantially up-and-down direction with respect to the first detection element 1).

As shown in FIGS. 2A and 3, the biasing part 8 connects the base 4 and the arm 5 in the rear of the arm rotation axis A. The arm 5 is biased toward one side a1 in the circumferential direction around the arm rotation axis A with respect to the base 4 by the biasing part 8.

Specifically, the biasing part 8 of this embodiment is, for example, a tension coil spring which is elastically deformable. In the illustrated example, the biasing part 8 connects the rear end portion 4b1 in the rear portion 4b of the base 4 and a front end portion 11c2 in the connection portion 11c of the arm 5.

In this embodiment, the projection portions 12a and 12b of the arm portions 11a and 11b which are located at the front end portion of the arm 5 are biased in an upward movement direction with respect to the front portion 4a of the base 4 by the biasing part 8, as shown by an arrow in FIG. 2B.

Further, the second detection element 2 which is located at the rear end portion 11c1 of the arm 5 is biased in a downward movement direction with respect to the first detection element 1 which is located at the rear end portion 4b1 of the base 4, by the biasing part 8, as shown in FIG. 3.

As shown in FIG. 2B, in a front view as viewed from the direction of the probe rotation axis M, the probe 6 is formed in a T-shape.

Specifically, as shown in FIGS. 1, 2A, and 2B, the probe 6 has a main body section 6a which is formed in a shaft shape or a rod shape and extends in the up-and-down direction (the vertical direction), and the pair of abutment parts 13a and 13b provided to protrude toward both sides along the direction of the arm rotation axis A from an upper end portion of the main body section 6a.

The probe rotation axis M is located at an upper end portion in the main body section 6a of the probe 6. The contact part 7 is provided at a lower end portion of the main body section 6a. In the example of this embodiment, the contact part 7 is formed in a spherical shape. The outer diameter of the contact part 7 is set to be larger than the outer diameter (the diameter) of a portion except for the contact part 7 in the main body section 6a.

Further, the probe rotation axis M extends along the horizontal direction toward the front from the arm rotation axis A in the virtual plane VS perpendicular to the arm rotation axis A.

Further, in the example shown in this embodiment, the arm rotation axis A and the probe rotation axis M are orthogonal to each other. However, there is no limitation thereto. For example, the arm rotation axis A and the probe rotation axis M which extends along the virtual plane VS may be disposed at mutually twisted positions.

As shown in FIG. 2B, in a front view as viewed from the direction of the probe rotation axis M, each of the pair of abutment parts 13a and 13b is formed in an L-shape which extends toward the outside along the direction of the arm rotation axis A from the main body section 6a of the probe 6 and then further extends downward.

Further, as shown in FIGS. 1, 2A and 2B, the pair of abutment parts 13a and 13b is provided at the upper end portion of the main body section 6a of the probe 6 so as to be disposed along the direction of the arm rotation axis A and on both sides with the probe rotation axis M interposed therebetween and is in contact with the arm 5 so as to be able to be separated from the arm 5.

In this embodiment, the pair of abutment parts 13a and 13b is disposed above the projection portions 12a and 12b which are located at the front end portions 11a2 and 11b2 of the arm portions 11a and 11b of the arm 5. Further, lower surfaces 14a and 14b facing downward in the abutment parts 13a and 13b are in contact with the tip portions (the upper end portions) of the projection portions 12a and 12b so as to be able to be separated from the upper side thereof.

Further, as shown in FIGS. 1 and 2A, the arm 5 is biased to one side a1 in the circumferential direction around the arm rotation axis A with respect to the base 4 by the biasing force of the biasing part 8, whereby the respective projection portions 12a and 12b provided at the pair of arm portions 11a and 11b of the arm 5 respectively bias the pair of abutment parts 13a and 13b of the probe 6 supported on the base 4, from both sides in the circumferential direction around the probe rotation axis M (from one side and the other side along the circumferential direction, that is, from both the clockwise direction and the counterclockwise direction around the probe rotation axis M).

Specifically, in this embodiment, the pair of projection portions 12a and 12b in the arm 5 respectively biases the pair of abutment parts 13a and 13b upward from both sides in the circumferential direction around the probe rotation axis M.

Next, a method of measuring displacement of the measured surface of the workpiece by using the bidirectional displacement detector 10 of this embodiment will be described.

As shown in FIGS. 2A and 2B, in this embodiment, in a free state (a reference position at a time other than the time of measurement) where the measured surface of the workpiece is not pressed against the contact part 7 of the bidirectional displacement detector 10, the probe 6 is located in the virtual plane VS perpendicular to the arm rotation axis A and extends along the vertical direction.

Further, each of the pair of projection portions 12a and 12b of the arm 5 is in contact with each of the lower surfaces 14a and 14b in the pair of abutment parts 13a and 13b of the probe 6 from the lower side thereof. Then, the pair of abutment parts 13a and 13b is biased upward by the projection portions 12a and 12b.

In this manner, the abutment parts 13a and 13b are biased in directions different from each other in the circumferential direction (the opposite directions in the circumferential direction) from both sides in the circumferential direction along the direction of the probe rotation axis M by the projection portions 12a and 12b, whereby the probe 6 is in a balanced state (an equilibrium state).

Figure 4A:
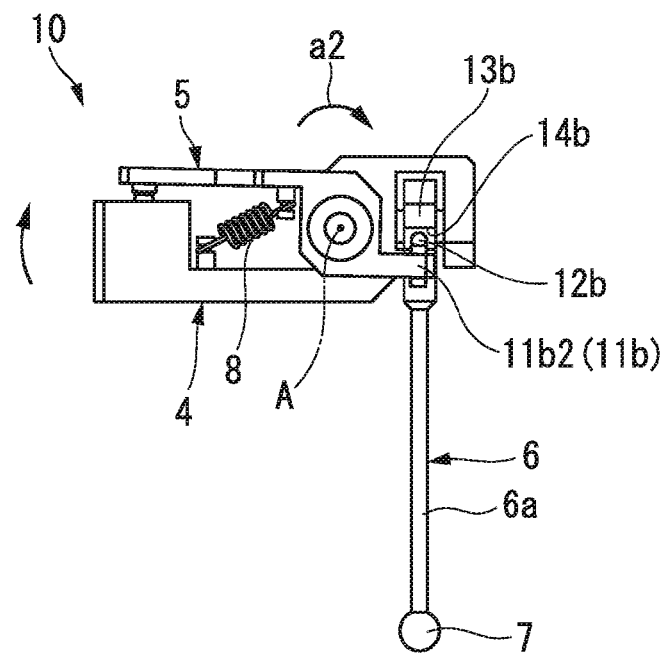
FIG. 4A is a diagram describing an operation at the time of measurement of the bidirectional displacement detector shown in FIG. 1 and shows a left side view.
Figure 4B:
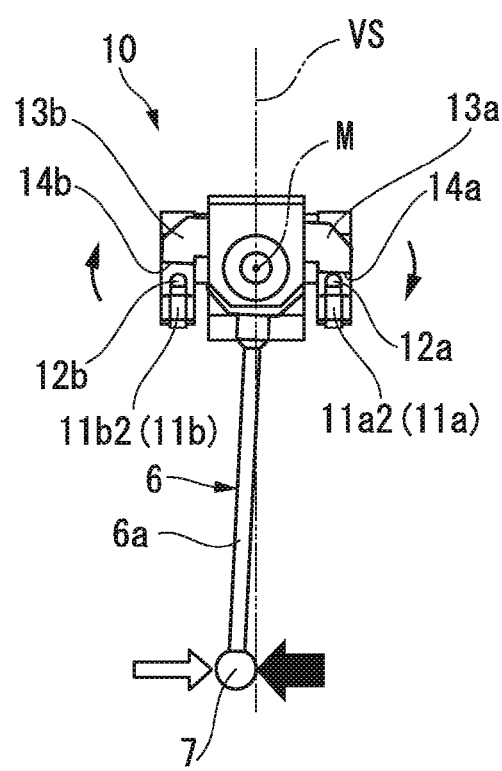
FIG. 4B is a diagram describing an operation at the time of measurement of the bidirectional displacement detector shown in FIG. 1 and shows a front view.

As shown in FIG. 4B, in a front view as viewed from the direction of the probe rotation axis M, in a case where the measured surface of the workpiece is pressed against the contact part 7 of the probe 6 toward the other side (the left side in FIG. 4B) from one side along the direction of the arm rotation axis A, a push force (a pressing force) shown by a black arrow in FIG. 4B acts on the contact part 7. In this way, the contact part 7 is pushed toward the other side along the direction of the arm rotation axis A and moves from a measurement position 0 (a reference position) to a position other than the measurement position 0.

For this reason, a measuring force toward one side (the right side in FIG. 4B) from the other side along the direction of the arm rotation axis A, such as being shown by a white arrow in FIG. 4B, is generated in the contact part 7 of the probe 6.

Figure 4C:
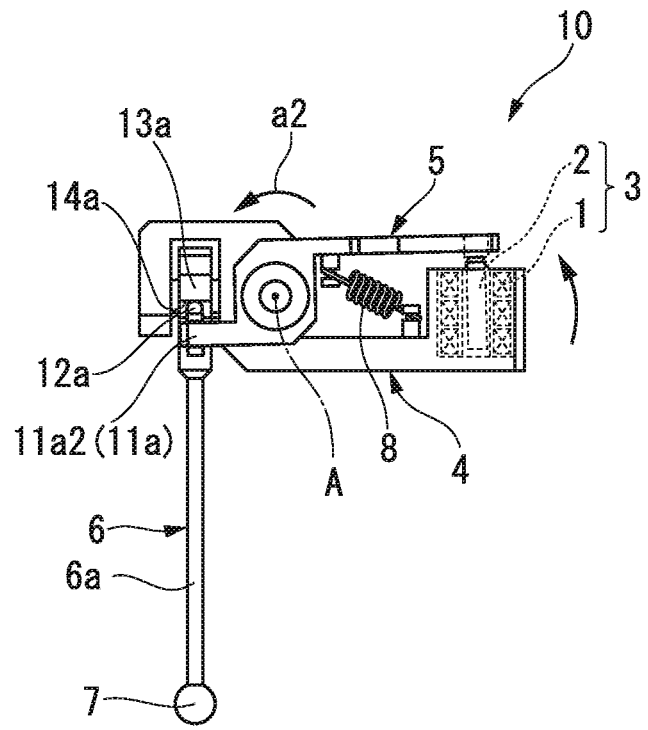
FIG. 4C is a diagram describing an operation at the time of measurement of the bidirectional displacement detector shown in FIG. 1 and shows a right side view.

Specifically, as shown in FIGS. 4A to 4C, the contact part 7 of the probe 6 is pushed toward the other side from one side in the direction of the arm rotation axis A, thereby rotationally moving in the circumferential direction around the probe rotation axis M with respect to the base 4.

For this reason, the abutment part 13a on one side, which is located on one side along the direction of the arm rotation axis A, out of the pair of abutment parts 13a and 13b of the probe 6, depresses the projection portion 12a on one side, which is located on one side along the direction of the arm rotation axis A, out of the pair of projection portions 12a and 12b of the arm 5, toward the lower side from the upper side thereof.

Further, at the same time, the abutment part 13b on the other side, which is located on the other side along the direction of the arm rotation axis A, out of the pair of abutment parts 13a and 13b of the probe 6, is separated upward from the projection portion 12b on the other side, which is located on the other side along the direction of the arm rotation axis A, out of the pair of projection portions 12a and 12b of the arm 5.

During the period from the moment the abutment part 13b on the other side is separated from the projection portion 12b on the other side in this manner and until the abutment part 13b comes into contact with the projection portion 12b again, a measuring force in a direction displacing the probe 6 so as to restore the probe 6 to the reference position is generated.

Further, as described above, the abutment part 13a on one side depresses the projection portion 12a on one side, whereby the arm 5 rotates with respect to the base 4 toward the other side a2 (a direction toward the side opposite to one side a1 in the circumferential direction shown in FIG. 2A and the like) in the circumferential direction around the arm rotation axis A.

In this way, the position of the second detection element 2 provided at the arm 5 is displaced with respect to the first detection element 1 provided at the base 4, whereby displacement of the measured surface of the workpiece is detected.

Figure 5A:
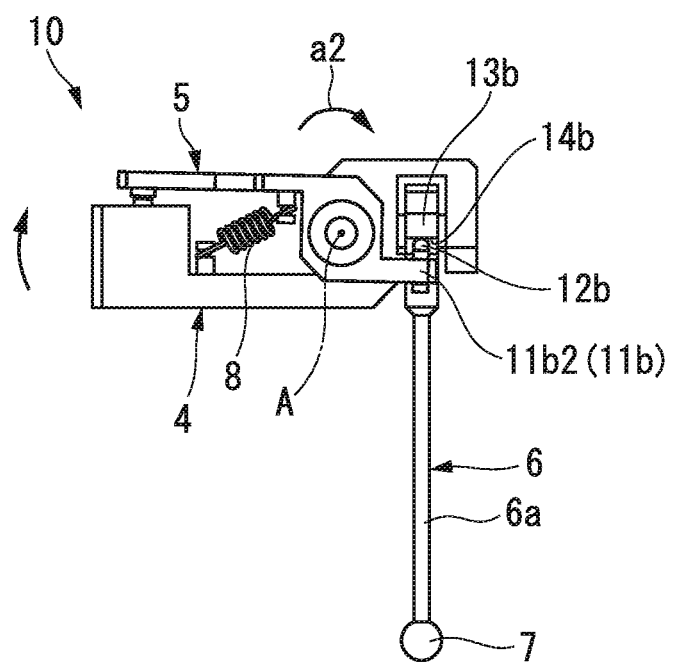
FIG. 5A is a diagram describing an operation at the time of measurement of the bidirectional displacement detector shown in FIG. 1 and shows a left side view.
Figure 5B:
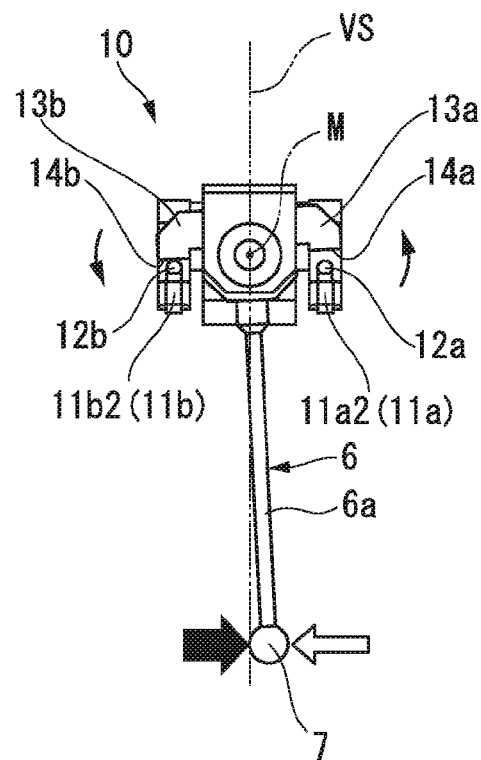
FIG. 5B is a diagram describing an operation at the time of measurement of the bidirectional displacement detector shown in FIG. 1 and shows a front view.

Further, as shown in FIG. 5B, in a front view as viewed from the direction of the probe rotation axis M, in a case where the measured surface of the workpiece is pressed against the contact part 7 of the probe 6 toward one side (the right side in FIG. 5B) from the other side along the direction of the arm rotation axis A, a push force shown by a black arrow in FIG. 5B acts on the contact part 7. In this way, the contact part 7 is pushed toward one side along the direction of the arm rotation axis A and moves from the measurement position 0 (the reference position) to a position other than the measurement position 0.

For this reason, a measuring force toward the other side (the left side in FIG. 5B) from one side along the direction of the arm rotation axis A, such as being shown by a white arrow in FIG. 5B, is generated in the contact part 7 of the probe 6.

Figure 5C:
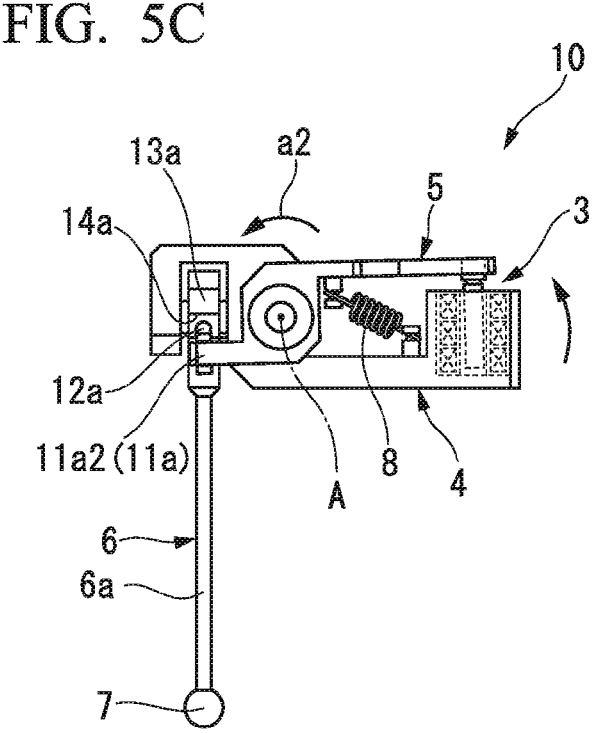
FIG. 5C is a diagram describing an operation at the time of measurement of the bidirectional displacement detector shown in FIG. 1 and shows a right side view.

Specifically, as shown in FIGS. 5A to 5C, the contact part 7 of the probe 6 is pushed toward one side from the other side in the direction of the arm rotation axis A, thereby rotationally moving in the circumferential direction around the probe rotation axis M with respect to the base 4.

For this reason, the abutment part 13b on the other side, which is located on the other side along the direction of the arm rotation axis A, out of the pair of abutment parts 13a and 13b of the probe 6, depresses the projection portion 12b on the other side, which is located on the other side along the direction of the arm rotation axis A, out of the pair of projection portions 12a and 12b of the arm 5, toward the lower side from the upper side thereof, Further, at the same time, the abutment part 13a on one side, which is located on one side along the direction of the arm rotation axis A, out of the pair of abutment parts 13a and 13b of the probe 6, is separated upward from the projection portion 12a on one side, which is located on one side along the direction of the arm rotation axis A, out of the pair of projection portions 12a and 12b of the arm 5.

From the moment the abutment part 13a on one side is separated from the projection portion 12a on one side in this manner, a measuring force in the direction displacing the probe 6 so as to restore the probe 6 to the reference position is generated.

Further, as described above, the abutment part 13b on the other side depresses the projection portion 12b on the other side, whereby the arm 5 rotates with respect to the base 4 toward the other side a2 (a direction toward the side opposite to one side a1 in the circumferential direction shown in FIG. 2A and the like) in the circumferential direction around the arm rotation axis A.

In this way, the position of the second detection element 2 provided at the arm 5 is displaced with respect to the first detection element 1 provided at the base 4, whereby displacement of the measured surface of the workpiece is detected.

Further, in a case where the pushing amount of the contact part 7 pushed in the direction of the arm rotation axis A by the measured surface of the workpiece is reduced, the contact part 7 is displaced so as to be restored by the measuring force. In this way, a state where the contact part 7 is in close contact with the measured surface is maintained and it is possible to detect the concavo-convex shape or the like of the measured surface.

According to the bidirectional displacement detector 10 of this embodiment described above, the arm 5 and the probe 6 are connected to the base 4 so as to be rotatable around the respective rotation axes (the arm rotation axis A and the probe rotation axis M). Further, the probe rotation axis M extends in the virtual plane VS perpendicular to the arm rotation axis A.

At the time of measurement such as roundness measurement, surface roughness measurement, or shape measurement by the bidirectional displacement detector 10, the measured surface of the work (an object to be measured) is presses against the contact part 7 of the probe 6. In this way, the probe 6 rotates to one side or the other side (one of two directions) in the circumferential direction around the probe rotation axis M with respect to the base 4 against the biasing force of the arm 5 biasing the pair of abutment parts 13a and 13b.

By the rotation of the probe 6, the arm 5 is separated from the other abutment part while being pressed against one abutment part out of the pair of abutment parts 13a and 13b, whereby the arm 5 rotates toward the other side a2 (the side opposite to one side a1 along the circumferential direction, on which the arm 5 is biased) in the circumferential direction around the arm rotation axis A with respect to the base 4.

By the rotation of the arm 5, the relative position between the first detection element 1 provided at the base 4 and the second detection element 2 provided at the arm 5 is displaced, whereby it is possible to detect the displacement of the measured surface.

Figure 6A:
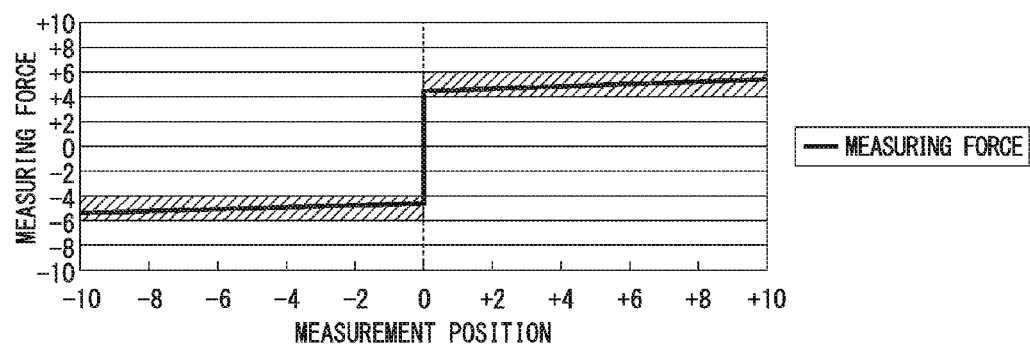
FIG. 6A shows a graph showing the relationship between a measurement position and a measuring force in a bidirectional displacement detector according to an embodiment of the present invention.
Figure 6B:
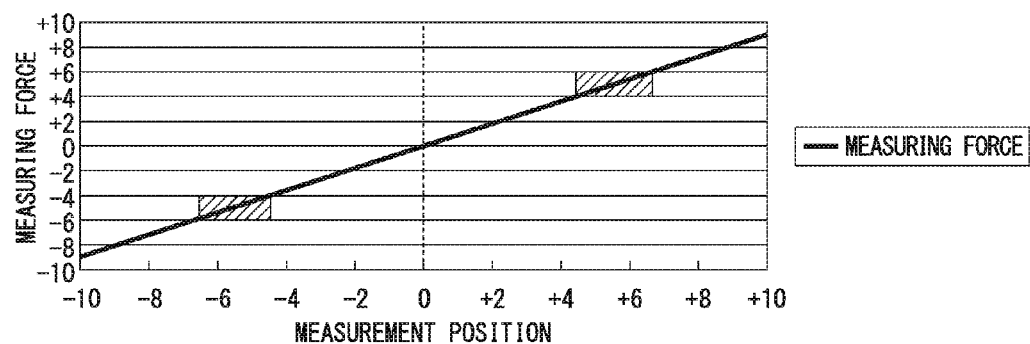
FIG. 6B shows a graph showing the relationship between a measurement position and a measuring force in a bidirectional displacement detector according to the related art.
Figure 6C:
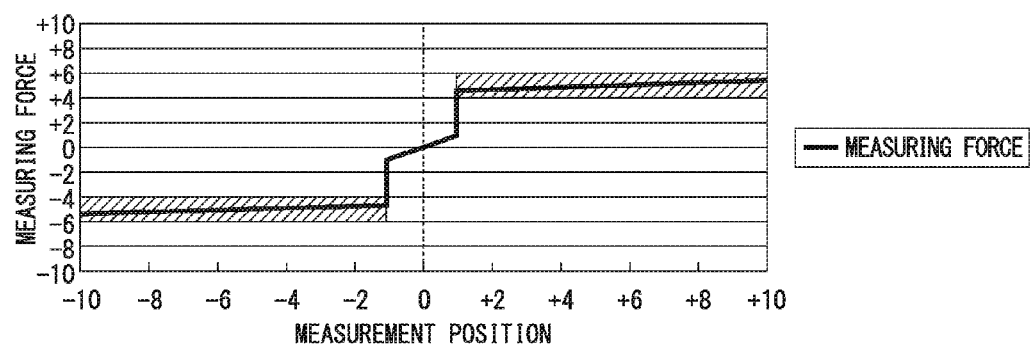
FIG. 6C shows a graph showing the relationship between a measurement position and a measuring force in another bidirectional displacement detector according to the related art.

Here, a graph of FIG. 6A shows the relationship between the measurement position (a displacement amount toward a detection direction (plus or minus) from the reference position (the measurement position 0) of the contact part 7) and the measuring force in the bidirectional displacement detector 10 of this embodiment.

Further, the portion shown by hatching in the drawing shows a usable range (an allowable range of the measurement position) of the bidirectional displacement detector 10. In the illustrated example, the measurement positions corresponding to the range of the measuring force from −6 to −4 and the range of the measuring force from +4 to +6 are set as the usable ranges.

As shown in this graph, according to this embodiment, the contact part 7 is pressed against the measured surface, whereby the probe 6 begins to rotate around the probe rotation axis M, and from the moment one abutment part out of the pair of abutment parts 13a and 13b of the probe 6 is separated from the arm 5, detection of displacement becomes possible.

That is, according to this embodiment, even in a state where the contact part 7 is not in contact with the measured surface of the workpiece, it is possible to create a stand-by state of being able to immediately apply a sufficient measuring force (a force pressing the contact part 7 against the measured surface of the workpiece by biasing, that is, contact pressure) from two directions along the detection direction (both sides in the circumferential direction around the probe rotation axis M) to the contact part 7.

Specifically, at the moment one abutment part out of the pair of abutment parts 13a and 13b is separated from the arm 5 by pushing of the contact part 7 (pressing against the contact part 7) by the measured surface, the measuring force immediately reaches from 0 to a predetermined value (a predetermined range).

Therefore, a transfer area or the like, in which the measuring force remains in the vicinity of 0, as in the related art, whereby a detection value becomes unstable, does not exist. For this reason, as shown in FIG. 6A, if it is a measurement position with the exception of 0, even toward one side (the plus side) in which the measurement position exceeds 0, out of two directions (both sides in the horizontal axis with the measurement position 0 interposed therebetween) in which displacement is detected, or even toward the other side (the minus side) in which the measurement position is less than 0, a sufficient measuring force can be secured even in the vicinity of the measurement position 0.

Further, the pair of abutment parts 13a and 13b of the probe 6 each come into contact with the arm 5 from both sides in the circumferential direction around the probe rotation axis M and is biased with an equal force toward the opposite side in the circumferential direction, thereby being balanced. Therefore, it is possible to accurately set a detection limit position in advance with the equilibrium state as a reference position and based on the relative position between the first and second detection elements 1 and 2 of the displacement detector 3 at the reference position.

That is, in this embodiment, it is possible to stabilize the reference position of the contact part 7 at a time other than the time of measurement, and position accuracy of the contact part 7 at the reference position is secured with a high degree of accuracy. Therefore, even if the displacement detector 3 which is composed of the first detection element 1 and the second detection element 2 in a pair is only one set, it is possible to secure a large measurement range of displacement detection and it is possible to stably enhance detection accuracy.

Further, according to this embodiment, it is not necessary to use a complicated structure in which a plurality of displacement detector, a plurality of arms, a plurality of springs, a plurality of stoppers, and the like are provided, as in the related art, and thus a structure can be simplified.

From the above, according to this embodiment, it is possible to reduce a manufacturing cost by simplifying a structure, and it is possible to improve displacement detection performance by securing a large usable range of the measurement position.

Further, in this embodiment, the biasing part 8 for biasing the arm 5 toward one side a1 in the circumferential direction around the arm rotation axis A with respect to the base 4 is provided, and therefore, the following operation and effects are exhibited.

That is, the arm 5 is reliably biased toward one side a1 in the circumferential direction around the arm rotation axis A with respect to the base 4. In this way, the arm 5 can stably bias each of the pair of abutment parts 13a and 13b of the probe 6 from each of both sides in the circumferential direction around the probe rotation axis M.

Further, in this embodiment, it is acceptable if a configuration is made such that the arm 5 is biased toward one side a1 in the circumferential direction around the arm rotation axis A with respect to the base 4 and can bias each of the pair of abutment parts 13a and 13b from each of both sides in the circumferential direction around the probe rotation axis M. Therefore, the biasing part 8 is not an essential configuration and may not be provided.

For example, the arm 5 may be biased toward one side a1 in the circumferential direction around the arm rotation axis A with respect to the base 4 by the own weight of the arm 5.

In this case, in addition to being able to successfully achieving the above described operation and effects, a configuration can be made without requiring the biasing part 8. Therefore, the structure of a device can be simplified and a manufacturing cost can be reduced.

Further, the biasing part 8 is not limited to a configuration of generating a biasing force by using a spring such as the above-described tension coil spring, and for example, a configuration of generating a biasing force by using an electromagnetic force or the like is also acceptable.

Further, in this embodiment, measurement direction detector such as an encoder which can detect a direction in which the probe 6 rotates when the contact part 7 is pressed against the measured surface of the workpiece, in the circumferential direction around the probe rotation axis M, may be provided.

Second Embodiment

Next, a bidirectional displacement detector 30 according to a second embodiment of the present invention will be described with reference to the drawings.

In addition, with respect to the same configurations as those in the above-described embodiment (the first embodiment), the same names or the same reference numerals are used and description thereof is omitted, and mainly, only differences will be described below.

As shown in FIGS. 7 to 11C, in the bidirectional displacement detector 30 of this embodiment, mainly, the structure of an abutment portion (in the vicinity of projection portions 22a and 22b or abutment parts 23a and 23b) between the arm 5 and the probe 6, a direction in which the arm 5 is biased around the arm rotation axis A with respect to the base 4 (a direction in which one side a1 in the circumferential direction around the arm rotation axis A is set), and the like are different from those in the bidirectional displacement detector 10 described above.

Figure 7:
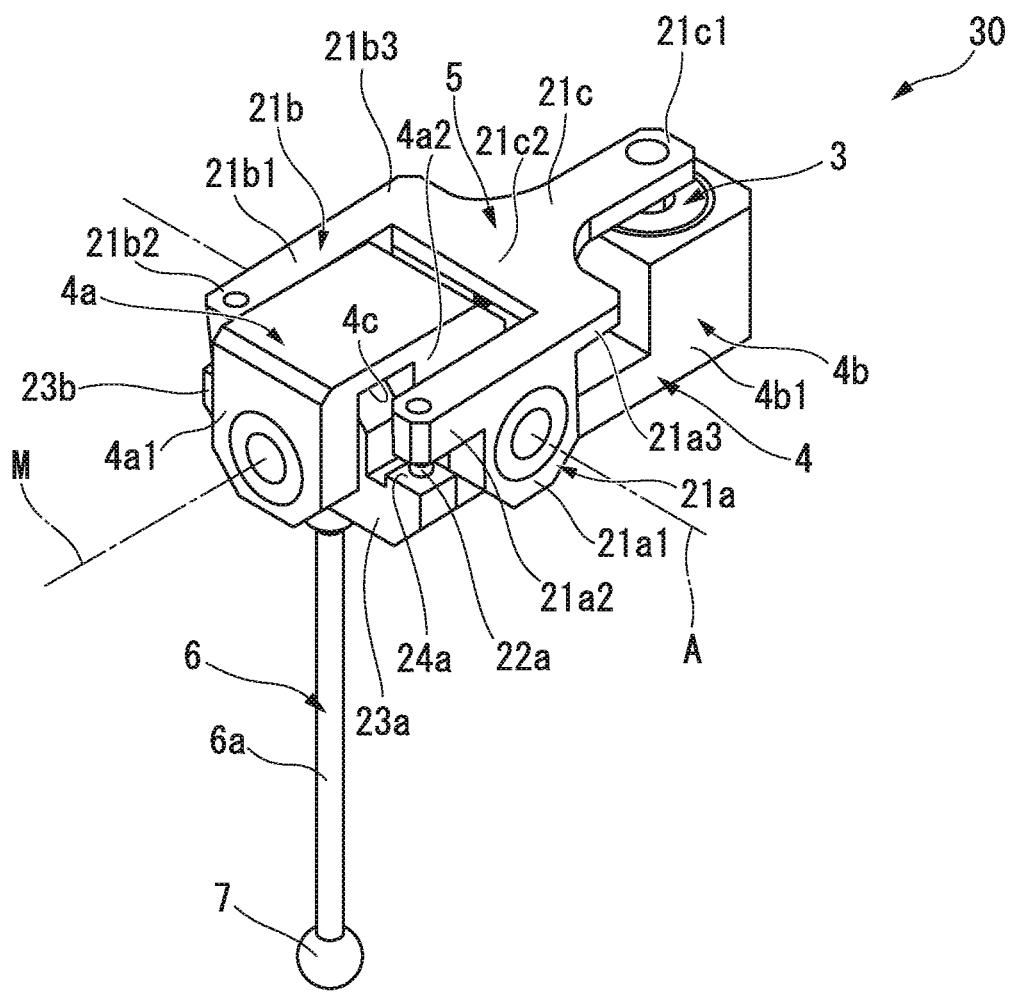
FIG. 7 is a perspective view showing a bidirectional displacement detector according to a second embodiment of the present invention.
Figure 8A:
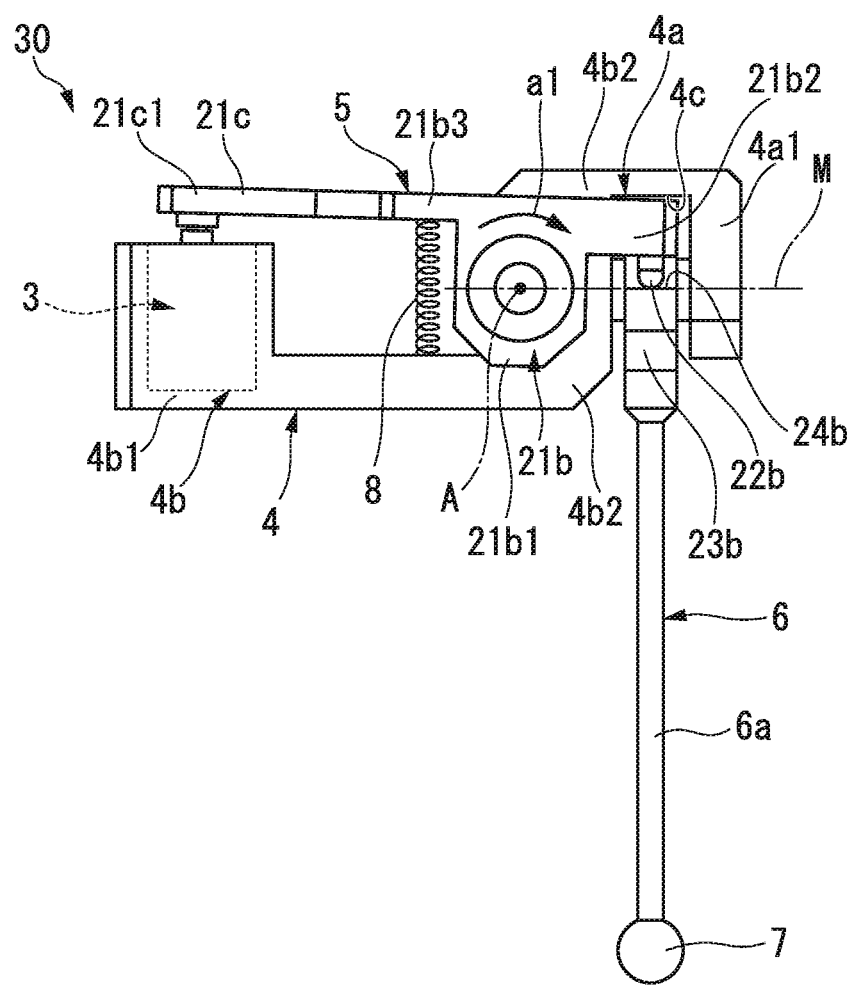
FIG. 8A is a left side view of the bidirectional displacement detector shown in FIG. 7.

As shown in FIGS. 7 and 8A, the arm 5 has a pair of arm portions 21a and 21b which forms the front portion of the arm 5, and a connection portion 21c which forms the rear portion of the arm 5 and connects the pair of arm portions 21a and 21b to each other.

The pair of arm portions 21a and 21b is disposed to be spaced apart from each other along the direction of the arm rotation axis A and on both sides of the base 4, and is supported on the base 4 so as to be rotatable around the arm rotation axis A.

The second detection element 2 is disposed at the connection portion 21c.

As shown in FIG. 8A, in a side view as viewed from the direction of the arm rotation axis A, each of the pair of arm portions 21a and 21b is formed in a T-shape. Further, in the side view, each of central portions 21a1 and 21b1 along the front-back direction of the arm portions 21a and 21b is formed in a rectangular shape long in the up-and-down direction. The arm rotation axis A is disposed at the central portions 21a1 and 21b1.

Further, in the arm portions 21a and 21b, front end portions 21a2 and 21b2 which are located further toward the front side than the central portions 21a1 and 21b1 are located above the arm rotation axis A and extend forward from upper end portions of the central portions 21a1 and 21b1.

The front end portions 21a2 and 21b2 of the arm portions 21a and 21b are disposed such that the front end portions 21a2 and 21b2 and the probe 6 are in corresponding positional relationships in the direction of the probe rotation axis M. The projection portions 22a and 22b are respectively provided to protrude downward at the front end portions 21a2 and 21b2.

Each of tip portions (lower end portions) of the projection portions 22a and 22b is formed in a hemispherical shape and disposed to face each of a pair of abutment parts 23a and 23b (described later) of the probe 6.

Further, in the arm portions 21a and 21b, rear end portions 21a3 and 21b3 which are located further toward the rear side than the central portions 21a1 and 21b1 are located above the arm rotation axis A and extend rearward from the upper end portions of the central portions 21a1 and 21b1.

As shown in FIG. 7, the connection portion 21c is formed in a T-shape when viewed in a top view. The connection portion 21c connects the rear end portions 21a3 and 21b3 of the pair of arm portions 21a and 21b to each other in the direction of the arm rotation axis A above the rear portion 4b of the base 4.

Figure 9:
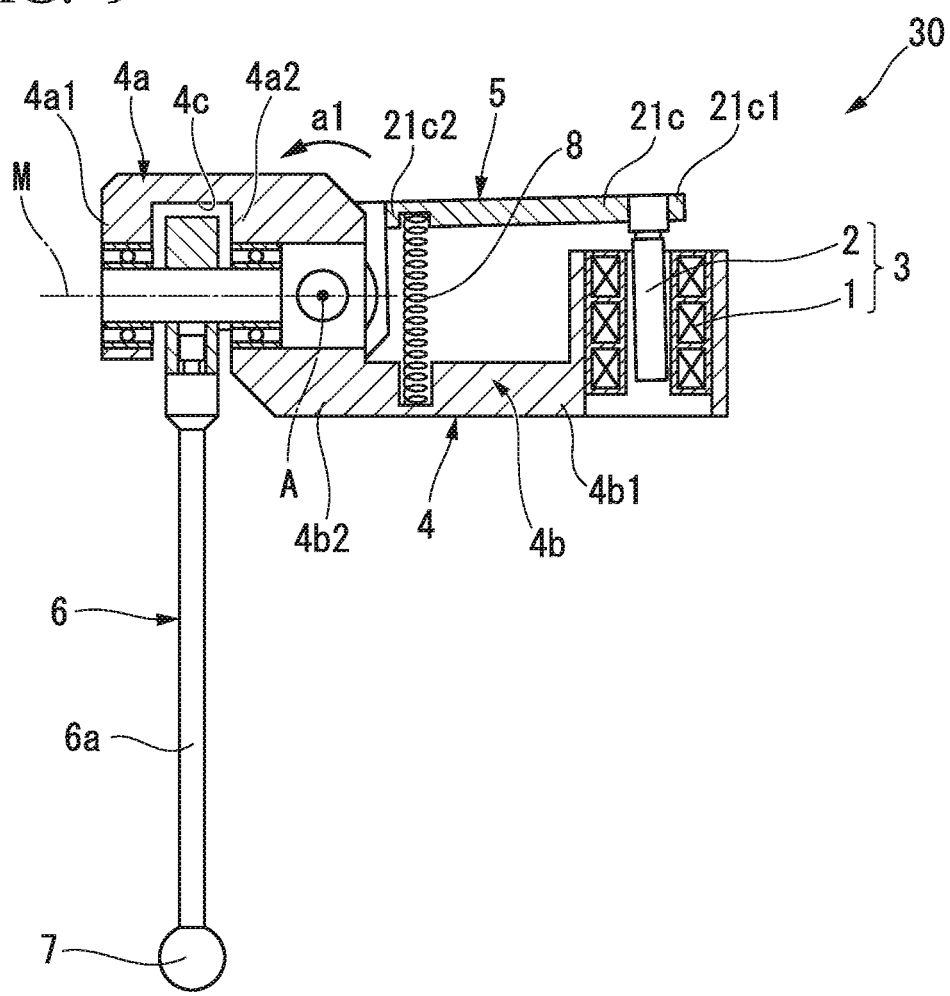
FIG. 9 is a right side sectional view of the bidirectional displacement detector shown in FIG. 7.

As shown in FIG. 9, the second detection element 2 is suspended from a rear end portion 21c1 of the connection portion 21c. The second detection element 2 is inserted into the first detection element 1 provided at the base 4 and is made so as to be movable with respect to the first detection element 1 in the circumferential direction around the arm rotation axis A (the substantially up-and-down direction with respect to the first detection element 1).

As shown in FIGS. 8A and 9, the biasing part 8 connects the base 4 and the arm 5 in the rear of the arm rotation axis A. The arm 5 is biased toward one side a1 in the circumferential direction around the arm rotation axis A with respect to the base 4 by the biasing part 8.

Specifically, the biasing part 8 of this embodiment is, for example, a compression coil spring which is elastically deformable. In the illustrated example, the biasing part 8 connects the front end portion 4b2 in the rear portion 4b of the base 4 and a front end portion 21c2 in the connection portion 21c of the arm 5.

Figure 8B:
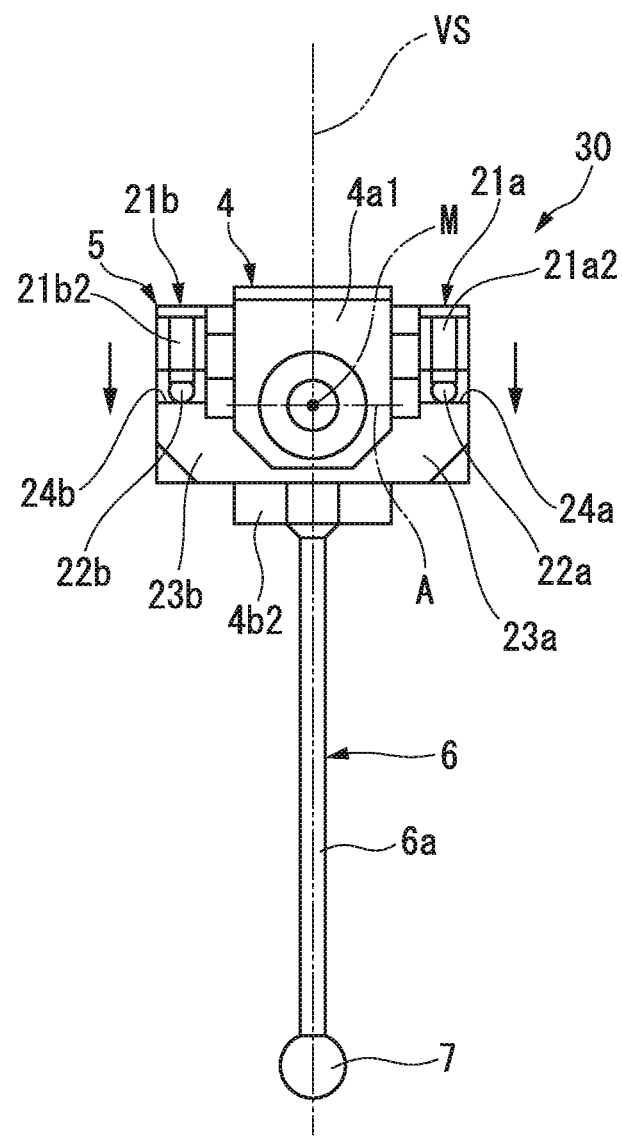
FIG. 8B is a front view of the bidirectional displacement detector shown in FIG. 7.

In this embodiment, the projection portions 22a and 22b of the arm portions 21a and 21b which are located at the front end portion of the arm 5 are biased in a downward movement direction with respect to the front portion 4a of the base 4 by the biasing part 8, as shown by an arrow in FIG. 8B.

Further, the second detection element 2 which is located at the rear end portion 21c1 of the arm 5 is biased in an upward movement direction with respect to the first detection element 1 which is located at the rear end portion 4b1 of the base 4, by the biasing part 8, as shown in FIG. 9.

As shown in FIG. 8B, in a front view as viewed from the direction of the probe rotation axis M, the probe 6 is formed in a T-shape.

Specifically, as shown in FIGS. 7, 8A, and 8B, the probe 6 has the main body section 6a which is formed in a shaft shape or a rod shape and extends in the up-and-down direction (the vertical direction), and the pair of abutment parts 23a and 23b provided to protrude toward the outside along the direction of the arm rotation axis A from the upper end portion of the main body section 6a.

Further, as shown in FIG. 8B, when viewed in a front view, each of the pair of abutment parts 23a and 23b is formed in an L-shape which extends toward the outside along the direction of the arm rotation axis A from the main body section 6a of the probe 6 and then further extends upward.

Further, as shown in FIGS. 7, 8A, and 8B, the pair of abutment parts 23a and 23b is provided at the upper end portion of the main body section 6a of the probe 6 so as to be disposed along the direction of the arm rotation axis A and on both sides with the probe rotation axis M interposed therebetween, and is in contact with the arm 5 so as to be able to be separated from the arm 5.

In this embodiment, the pair of abutment parts 23a and 23b is disposed below the projection portions 22a and 22b which are located at the front end portions 21a2 and 21b2 of the arm portions 21a and 21b of the arm 5. Further, upper surfaces 24a and 24b facing upward in the abutment parts 23a and 23b are in contact with the tip portions (the lower end portions) of the projection portions 22a and 22b so as to be able to be separated from the lower side thereof.

Further, as shown in FIGS. 7 and 8A, the arm 5 is biased to one side a1 in the circumferential direction around the arm rotation axis A with respect to the base 4 by the biasing force of the biasing part 8. In this way, the respective projection portions 22a and 22b provided at the pair of arm portions 21a and 21b of the arm 5 each bias the pair of abutment parts 23a and 23b of the probe 6 supported on the base 4, from both sides in the circumferential direction around the probe rotation axis M (from one side and the other side along the circumferential direction, that is, from both the clockwise direction and the counterclockwise direction around the probe rotation axis M).

Specifically, in this embodiment, the pair of projection portions 22a and 22b of the arm 5 each bias the pair of abutment parts 23a and 23b downward from both sides in the circumferential direction around the probe rotation axis M.

Next, a method of measuring displacement of the measured surface of the workpiece by using the bidirectional displacement detector 30 of this embodiment will be described.

As shown in FIGS. 8A and 8B, in this embodiment, in a free state (a reference position at a time other than the time of measurement) where the measured surface of the workpiece is not pressed against the contact part 7 of the bidirectional displacement detector 30, the probe 6 is located in the virtual plane VS perpendicular to the arm rotation axis A and extends along the vertical direction.

Further, each of the pair of projection portions 22a and 22b of the arm 5 is in contact with each of the upper surfaces 24a and 24b in the pair of abutment parts 23a and 23b of the probe 6 from the upper side thereof. In this way, the pair of abutment parts 23a and 23b is biased downward by the projection portions 22a and 22b.

In this manner, the abutment parts 23a and 23b are biased in directions different from each other in the circumferential direction (the opposite directions in the circumferential direction) from both sides in the circumferential direction along the direction of the probe rotation axis M by the projection portions 22a and 22b, whereby the probe 6 is in a balanced state (an equilibrium state).

Figure 10A:
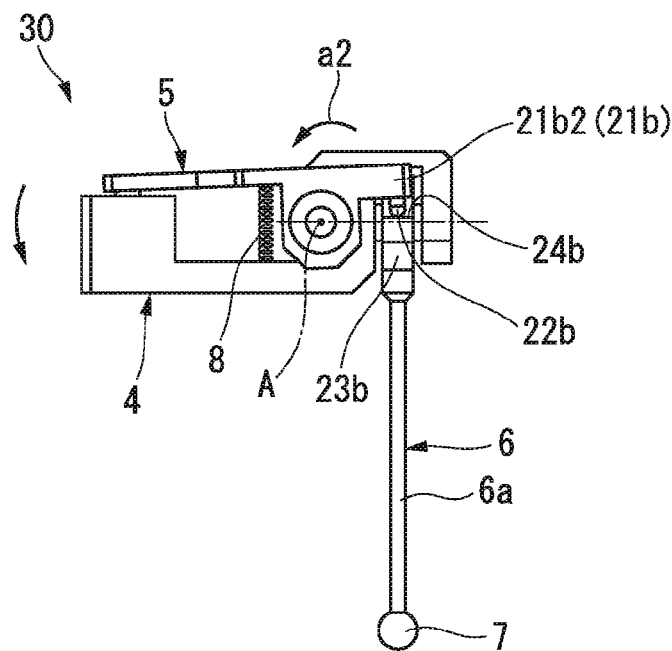
FIG. 10A is a diagram describing an operation at the time of measurement of the bidirectional displacement detector shown in FIG. 7 and shows a left side view.
Figure 10B:
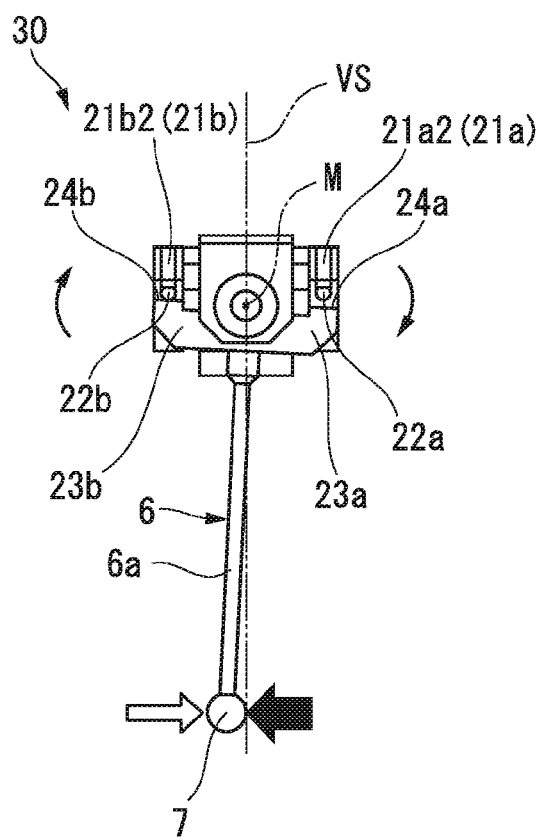
FIG. 10B is a diagram describing an operation at the time of measurement of the bidirectional displacement detector shown in FIG. 7 and shows a front view.

As shown in FIG. 10B, in a front view as viewed from the direction of the probe rotation axis M, in a case where the measured surface of the workpiece is pressed against the contact part 7 of the probe 6 toward the other side (the left side in FIG. 10B) from one side along the direction of the arm rotation axis A, a push force (a pressing force) shown by a black arrow in FIG. 10B acts on the contact part 7. In this way, the contact part 7 is pushed toward the other side along the direction of the arm rotation axis A and moves from the measurement position 0 (the reference position) to a position other than the measurement position 0.

For this reason, a measuring force toward one side (the right side in FIG. 10B) from the other side along the direction of the arm rotation axis A, such as being shown by a white arrow in FIG. 10B, is generated in the contact part 7 of the probe 6.

Figure 10C:
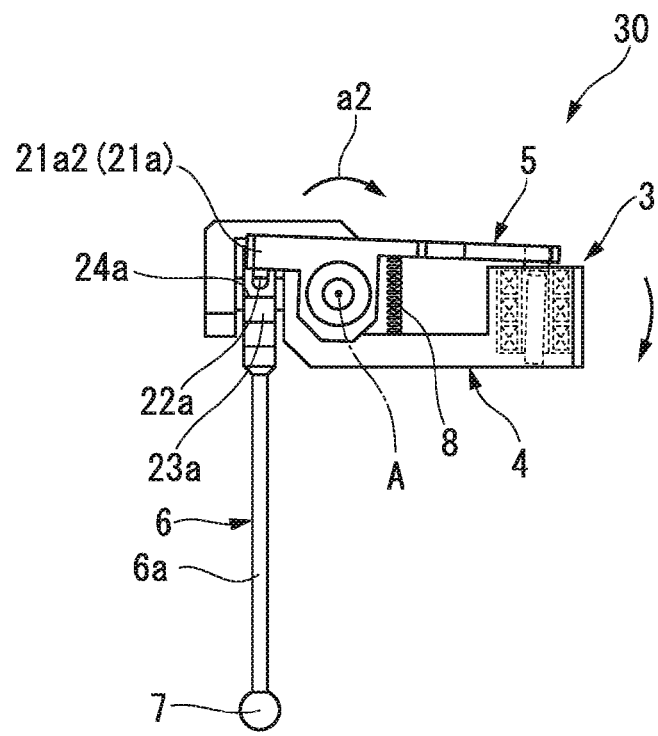
FIG. 10C is a diagram describing an operation at the time of measurement of the bidirectional displacement detector shown in FIG. 7 and shows a right side view.

Specifically, as shown in FIGS. 10A to 10C, the contact part 7 of the probe 6 is pushed toward the other side from one side in the direction of the arm rotation axis A, thereby rotationally moving in the circumferential direction around the probe rotation axis M with respect to the base 4.

In this way, the abutment part 23b on the other side, which is located on the other side along the direction of the arm rotation axis A, out of the pair of abutment parts 23a and 23b of the probe 6, pushes up the projection portion 22b on the other side, which is located on the other side along the direction of the arm rotation axis A, out of the pair of projection portions 22a and 22b of the arm 5, toward the upper side from the lower side thereof, Further, at the same time, the abutment part 23a on one side, which is located on one side along the direction of the arm rotation axis A, out of the pair of abutment parts 23a and 23b of the probe 6, is separated downward from the projection portion 22a on one side, which is located on one side along the direction of the arm rotation axis A, out of the pair of projection portions 22a and 22b of the arm 5.

During the period from the moment the abutment part 23a on one side is separated from the projection portion 22a on one side in this manner and until the abutment part 23a comes into contact with the projection portion 22a again, a measuring force in a direction displacing the probe 6 so as to restore the probe 6 to the reference position is generated.

Further, as described above, the abutment part 23b on the other side pushes up the projection portion 22b on the other side, whereby the arm 5 rotates toward the other side a2 (a direction toward the side opposite to one side a1 in the circumferential direction shown in FIG. 8A and the like) in the circumferential direction around the arm rotation axis A with respect to the base 4.

In this way, the position of the second detection element 2 provided at the arm 5 is displaced with respect to the first detection element 1 provided at the base 4, whereby displacement of the measured surface of the workpiece is detected.

Figure 11A:
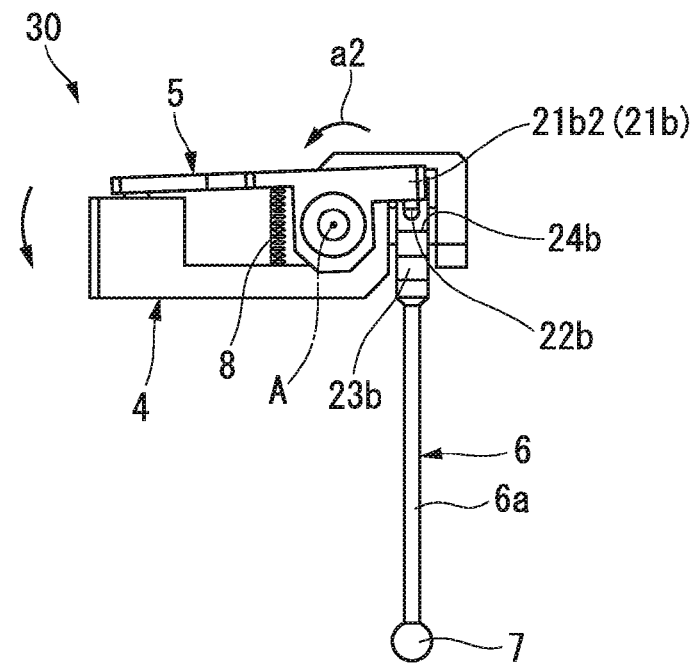
FIG. 11A is a diagram describing an operation at the time of measurement of the bidirectional displacement detector shown in FIG. 7 and shows a left side view.
Figure 11B:
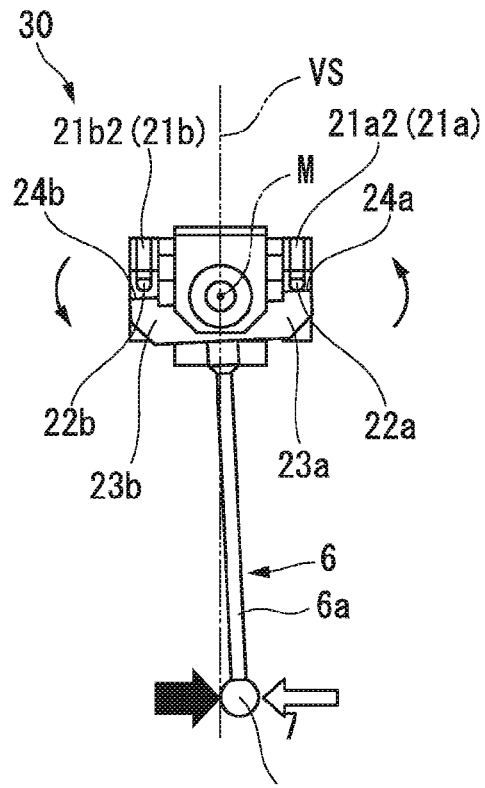
FIG. 11B is a diagram describing an operation at the time of measurement of the bidirectional displacement detector shown in FIG. 7 and shows a front view.

Further, as shown in FIG. 11B, in a front view as viewed from the direction of the probe rotation axis M, in a case where the measured surface of the workpiece is pressed against the contact part 7 of the probe 6 toward one side (the right side in FIG. 11B) from the other side along the direction of the arm rotation axis A, a push force shown by a black arrow in FIG. 11B acts on the contact part 7. In this way, the contact part 7 is pushed toward one side along the direction of the arm rotation axis A and moves from the measurement position 0 (the reference position) to a position other than the measurement position 0.

For this reason, a measuring force toward the other side (the left side in FIG. 11B) from one side along the direction of the arm rotation axis A, such as being shown by a white arrow in FIG. 11B, is generated in the contact part 7 of the probe 6.

Figure 11C:
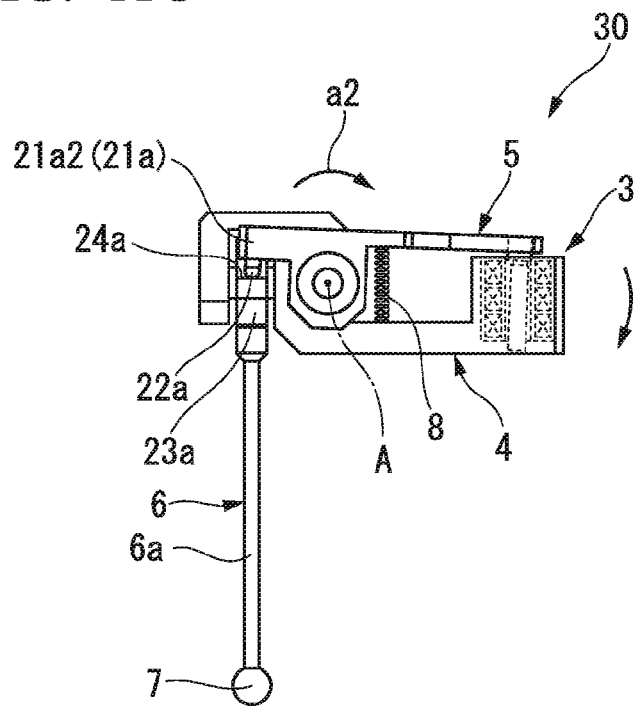
FIG. 11C is a diagram describing an operation at the time of measurement of the bidirectional displacement detector shown in FIG. 7 and shows a right side view.

Specifically, as shown in FIGS. 11A to 11C, the contact part 7 of the probe 6 is pushed toward one side from the other side in the direction of the arm rotation axis A, thereby rotationally moving in the circumferential direction around the probe rotation axis M with respect to the base 4. In this way, the abutment part 23a on one side, which is located on one side along the direction of the arm rotation axis A, out of the pair of abutment parts 23a and 23b of the probe 6, pushes up the projection portion 22a on one side, which is located on one side along the direction of the arm rotation axis A, out of the pair of projection portions 22a and 22b of the arm 5, toward the upper side from the lower side thereof, Further, at the same time, the abutment part 23b on the other side, which is located on the other side along the direction of the arm rotation axis A, out of the pair of abutment parts 23a and 23b of the probe 6, is separated downward from the projection portion 22b on the other side, which is located on the other side along the direction of the arm rotation axis A, out of the pair of projection portions 22a and 22b of the arm 5.

From the moment the abutment part 23b on the other side is separated from the projection portion 22b on the other side in this manner, a measuring force in the direction displacing the probe 6 so as to restore the probe 6 the reference position is generated.

Further, as described above, the abutment part 23a on one side pushes up the projection portion 22a on one side, whereby the arm 5 rotates toward the other side a2 (a direction toward the side opposite to one side a1 in the circumferential direction shown in FIG. 8A and the like) in the circumferential direction around the arm rotation axis A with respect to the base 4.

In this way, the position of the second detection element 2 provided at the arm 5 is displaced with respect to the first detection element 1 provided at the base 4, whereby displacement of the measured surface of the workpiece is detected.

According to the bidirectional displacement detector 30 of this embodiment described above, it is possible to obtain the same operation and effects as those in the above-described embodiment.

In addition, the present invention is not limited to the embodiments described above, and various changes can be made within a scope which does not depart from the gist of the present invention.

For example, in the embodiments described above, the probe 6 (specifically, the shaft-shaped main body section 6a at which the contact part 7 is provided) has been described as extending toward the lower side in the vertical direction in a direction orthogonal to the probe rotation axis M, from the probe rotation axis M. However, there is no limitation thereto. For example, a configuration is also acceptable in which the probe rotation axis M extends in the vertical direction and the probe 6 extends in the horizontal direction.

In addition, the respective configurations (constituent elements) described in the above-described embodiments, modification examples, incidental description, and the like may be combined within a the scope which does not depart from the gist of the present invention, and addition, omission, substitution, and other changes of a configuration can be made within a the scope which does not depart from the gist of the present invention. Further, the present invention is not limited by the above-described embodiments, but is limited only by the scope of the appended claims.

INDUSTRIAL APPLICABILITY

According to the present invention, it is possible to reduce the manufacturing costs by simplifying a structure, and it is possible to improve displacement detection performance by securing a large usable range of a measurement position. Accordingly, the present invention has industrial applicability.

REFERENCE SIGNS LIST

1: first detection element
2: second detection element
3: displacement detector
4: base
5: arm
6: probe
7: contact part
8: biasing part
10, 30: bidirectional displacement detector
13a, 23a: abutment part on one side
13b, 23b: abutment part on the other side
A: arm rotation axis
a1: one side in a circumferential direction around an arm rotation axis
M: probe rotation axis
VS: virtual plane perpendicular to an arm rotation axis

The invention claimed is:

1. A bidirectional displacement detector comprising:
a displacement detector which includes a first detection element and a second detection element movable relative to each other;
a base at which the first detection element is provided;
an arm which is coupled to the base so as to be rotatable around an arm rotation axis extending in a horizontal direction, and at which the second detection element is provided; and
a probe which is coupled to the base so as to be rotatable around a probe rotation axis extending along a virtual plane perpendicular to the arm rotation axis,
wherein the probe has
a contact part provided at a position away from the probe rotation axis, and
a pair of abutment parts which is disposed along a direction of the arm rotation axis and on both sides with the probe rotation axis interposed therebetween and comes into contact with the arm so as to be able to be separated from the arm, and
each of the pair of abutment parts is in contact with the arm from the lower side thereof and is biased upward.

2. The bidirectional displacement detector according to claim 1,
wherein the arm rotation axis and the probe rotation axis are orthogonal to each other.

3. The bidirectional displacement detector according to claim 1,
wherein the arm rotation axis and the probe rotation axis are disposed at mutually twisted positions.

4. A bidirectional displacement detector comprising:
a displacement detector which includes a first detection element and a second detection element movable relative to each other;
a base at which the first detection element is provided;
an arm which is coupled to the base so as to be rotatable around an arm rotation axis extending in a horizontal direction, and at which the second detection element is provided; and
a probe which is coupled to the base so as to be rotatable around a probe rotation axis extending along a virtual plane perpendicular to the arm rotation axis,
wherein the probe has
a contact part provided at a position away from the probe rotation axis, and
a pair of abutment parts which is disposed along a direction of the arm rotation axis and on both sides with the probe rotation axis interposed therebetween and comes into contact with the arm so as to be able to be separated from the arm, and
each of the pair of abutment parts is in contact with the arm from the upper side thereof and is biased downward.

5. The bidirectional displacement detector according to claim 4, wherein the arm rotation axis and the probe rotation axis are orthogonal to each other.

6. The bidirectional displacement detector according to claim 4, wherein the arm rotation axis and the probe rotation axis are disposed at mutually twisted positions.

* * * * *